United States Patent [19]

Hamill, III et al.

[11] 4,135,239

[45] Jan. 16, 1979

[54] NUMERICALLY CONTROLLED MACHINE TOOL SYSTEM

[75] Inventors: Samuel M. Hamill, III, Scituate; James C. Kilbane, Belmont; Stanley F. Zamkow, North Abington, all of Mass.

[73] Assignee: Hamill Company, Inc., Norwell, Mass.

[21] Appl. No.: 688,891

[22] Filed: May 21, 1976

Related U.S. Application Data

[62] Division of Ser. No. 652,143, Jan. 26, 1976.

[51] Int. Cl.² .......................................... G06F 15/46
[52] U.S. Cl. .................................. 364/107; 318/569; 318/574; 364/474
[58] Field of Search ............... 318/568, 569, 571–574; 364/200, 900, 474, 107, 117, 120

[56] References Cited

U.S. PATENT DOCUMENTS

| | | | |
|---|---|---|---|
| 3,543,910 | 12/1970 | Devol et al. | 364/120 |
| 3,634,662 | 1/1972 | Slawson | 364/107 |
| 3,689,892 | 9/1972 | Glenn et al. | 318/568 |
| 3,766,369 | 10/1973 | Watanabe et al. | 364/474 |
| 3,783,253 | 1/1974 | Anderson et al. | 364/117 |
| 3,816,723 | 6/1974 | Slawson | 364/107 |
| 3,878,983 | 4/1975 | Hamill et al. | 364/107 |
| 3,904,858 | 9/1975 | Rosshirt | 364/118 |
| 3,920,972 | 11/1975 | Corwin, Jr. et al. | 364/107 |
| 3,970,830 | 7/1976 | White et al. | 364/474 |

*Primary Examiner*—Felix D. Gruber
*Attorney, Agent, or Firm*—Kenway & Jenney

[57] ABSTRACT

A system in which a machine tool is controlled by a digital computer and an operator to perform a succession of machining operations at a succession of spatial points. The system includes means for operator-controlled entry of data defining the succession of machining operations to be performed, and position data representative of the absolute or incremental coordinates of the spatial points. The position data is stored in absolute coordinate form. In a run mode, the system selectively transforms the stored absolute coordinate data and the machining operation data to control signals for the machine tool.

6 Claims, 10 Drawing Figures

NUMERICALLY CONTROLLED MACHINE TOOL SYSTEM

REFERENCE TO RELATED APPLICATION AND PATENT

The present application is a division of application Ser. No. 652,143, filed Jan. 26, 1976. The subject matter of the present application is related to the subject matter of the U.S. Pat. No. 3,878,983, issued on Apr. 22, 1975 and assigned to the same assignee as is the present application, and that patent is incorporated by reference in the present application.

SUMMARY OF THE INVENTION

According to one aspect of the present invention, an AUTOMATIC FIRST UNPROGRAMMED SEQUENCE SELECT control provides an aid for the operator in programming the ordered succession of SEQUENCES to be stored in the computer memory. More particularly, for an embodiment of the present invention which includes the embodiment described in the above-referenced Pat. No. 3,878,983, in the PROGRAM-EDIT mode, the operator may activate an AUTOMATIC FIRST UNPROGRAMMED SEQUENCE SELECT control followed by activation of the appropriate controls to enter a desired SEQUENCE in the normal manner. In response thereto, the computer automatically assigns the first previously unassigned SEQUENCE number (and corresponding position in the stored ordered succession) to the entered SEQUENCE. Accordingly, with this aspect of the present invention, it is not incumbent upon the operator to know the number of the last programmed SEQUENCE and select that SEQUENCE as a current SEQUENCE before adding a new SEQUENCE.

A further aspect of the present invention includes means to further facilitate operator controlled procedures for establishing sets of machining operations in a plurality of planes. As described in U.S. Pat. No. 3,878,983, the operator may generate a succession of one coordinate Z SEQUENCES and two coordinate X-Y SEQUENCES wherein the one coordinate SEQUENCES direct cutting element motion in the direction of the Z axis, and the two coordinate SEQUENCES direct cutting element motion in a plane parallel to the plane formed by the X and Y axes.

In accordance with the present invention, means is provided whereby the operator may selectively generate one coordinate SEQUENCES for directing cutting element motion along any one of the machine tool axes, and two coordinate SEQUENCES for directing cutting element motion in any two coordinate plane. The present invention further includes a SEQUENCE transformation means which is adapted for operation in the RUN mode to identify a current SEQUENCE as a one coordinate SEQUENCE and produce a corresponding series of one coordinate axis drive signals which are applied to an axis drive means to drive the cutting element in the direction of the associated one coordinate axis. Similarly, in the RUN mode, the transformation means is adapted to identify a current SEQUENCE as a two coordinate SEQUENCE and produce a corresponding series of two coordinate axis drive signals in the same manner as that described in the referenced patent (i.e. a one coordinate major moves and two coordinate minor moves in accordance with the best straight line algorith defined therein). These signals are applied to drive means adapted to drive the cutting element along the best straight line in a plane parallel to the plane formed by the two coordinate axes associated with the two coordinate SEQUENCE. Thus, for example, with a machine tool having four axes (e.g. X, Y, Z and A), the operator may selectively generate X, Y, Z or A SEQUENCES, and X-Y, X-Z, Y-Z, X-A (and others) SEQUENCES. Of course, where one of the axes is a rotational axis, such as the A axis, the consequent cutting element motion in the RUN mode from an X-A SEQUENCE, while a best straight line in the abstract X-A plane, is along a helical path with respect to the X, Y and Z axes coordinate system.

In addition, means is provided whereby any of the two coordinate SEQUENCES may alternatively be programmed as a two coordinate CIRCULAR INTERPOLATION SEQUENCE. The transformation means is adapted for operation in the RUN mode to identify a current SEQUENCE as a two coordinate CIRCULAR INTERPOLATION SEQUENCE and produce a corresponding series of two coordinate circular interpolation axis drive signals in the same manner as that described in the referenced patent. These signals are applied to drive means which are responsive to drive the cutting element along a circular path in a plane parallel to the plane formed by the two coordinate axes associated with the two coordinate CIRCULAR INTERPOLATION SEQUENCE.

According to another aspect of the present invention, the operator may readily direct the performance of a succession of identical drilling operations, each at a specified location on the workpiece, using only a single SEQUENCE for each location, following the generation and storage of the defining drilling SEQUENCE set corresponding to the drilling operation at the first location.

More particularly, in the embodiment described in the above-referenced U.S. Pat. No. 3,878,983, a single drilling operation may be established, for example, by the generation of an X-Y SEQUENCE and a PECK CYCLE Z SEQUENCE pair or by an X-Y SEQUENCE and a pair of successive, non-PECK CYCLE Z SEQUENCES. It will be understood that the first SEQUENCE in a PECK CYCLE pair establishes a repetitive up and down motion (i.e. with fixed X and Y coordinates) wherein the cutting element is alternatively moved in increasing increments toward the Z coordinate stored in association with the first SEQUENCE and returned to a reference Z coordinate, with the cutting element motion ultimately terminating at the Z coordinate stored with the first SEQUENCE. The second SEQUENCE in the pair directs motion to the Z coordinate stored in association therewith the X,Y coordinates remaining fixed. That is, the first SEQUENCE directs the cutting element to drill the hole, and the second SEQUENCE directs withdrawal of the cutting element. In order to perform the same drilling operation at one or more different locations with the system of U.S. Pat. No. 3,878,983, the operator must program for each desired location a new X-Y sequence and, in addition, the same PECK CYCLE SEQUENCE pair or pair of non-PECK CYCLE Z SEQUENCES must be entered by the operator.

In accordance with an embodiment of the present invention which includes the embodiment described in U.S. Pat. No. 3,878,983, the operator may direct a plurality of drilling operations by entering a single drilling directive (including an X-Y SEQUENCE and either a PECK CYCLE Z SEQUENCE pair or non-PECK CYCLE Z SEQUENCE pair) for the first location and then only a single X-Y AUTODRILL SEQUENCE with an identifying tag for each additional X,Y location at which an identical drilling operation is desired. In the RUN mode, the computer identifies each AUTO-DRILL SEQUENCE, controls the cutting element relative position to the X and Y coordinates associated with the X-Y SEQUENCE and then directs relative movement in the Z direction in accordance with the last previous PECK CYCLE Z SEQUENCE pair or non-PECK CYCLE Z SEQUENCE pair in the succession of SEQUENCES stored in the computer memory.

Still another aspect of the present invention provides a further aid to the operator controlled programming of a succession of machining operations by providing the operator with means to direct the cutting element to a succession of spatial points displaced from the thus far programmed points by a predetermined distance, but otherwise identical thereto.

According to this aspect in an embodiment which includes the embodiment described in U.S. Pat. No. 3,878,983, the operator may in the RUN mode activate a RUNTHROUGH control for a selected succession of SEQUENCES. In response thereto, the computer directs the cutting element to successively pass through the succession of points characterized by a predetermined Z coordinate and the X, Y coordinates respectively associated with the selected succession of SEQUENCES. In addition, this runthrough operation may be accompanied by operator-activation of a RUN-THROUGH SPEED control, in response to which the relative velocity of the cutting element is controlled to be a predetermined constant. Thus, in accordance with this aspect of the present invention, the operator may, for example, at any time during the entry of SEQUENCES in the PROGRAM-EDIT mode, switch to the RUN mode and direct a rapid rate runthrough of the SEQUENCES so far programmed whereby the cutting element is offset from the workpiece but otherwise directed through the succession of spatial points. The offset distance may be established by manually displacing the workpiece with respect to the cutting element, or, in other embodiments, may be established automatically by the computer in response to activation of the RUNTHROUGH control.

Yet another aspect of the present invention provides a further aid for the operator in programming the ordered succession of SEQUENCES to be stored in the computer memory, whereby a helical relative path for the cutting element with respect to an axis may be established through the entry of a HELICAL SEQUENCE pair.

More particularly, for an embodiment of the present invention which includes the embodiment described in the above-referenced U.S. Pat. No. 3,878,983, and which further includes an A-axis degree of freedom corresponding to rotation about the Z axis, the operator may enter a HELICAL SEQUENCE pair in the PROGRAM-EDIT mode. The first HELICAL SEQUENCE of the pair specifies the initial Z coordinate $Z_o$, distance from the Z axis, $R_o$, initial angular displacement $\theta_o$ (about the Z axis) of the starting point of the desired helical path, and further specifies the speed (or feedrate) at which the cutting element is to approach this initial point. The second HELICAL SEQUENCE of the pair specifies the final point of the helix in terms of the length coordinate L (represented by the distance of the final point from the origin along the helix axis), and the angular displacement coordinate D (represented by the product of the helix density (or number of revolutions per unit length) along the helix axis times 360 degrees times the length coordinate L), and the helix direction from the origin (clockwise, +, or counterclockwise, −). In response thereto, in the RUN mode, the computer first identifies the first HELICAL SEQUENCE of the pair and then generates appropriate axis motion signals to direct the cutting element relative position along the defined helical path as defined by the pair.

This aspect of the present invention may be incorporated in embodiments such as that disclosed in the above-referenced patent for a milling or grinding machine tool, or alternatively, in a lathe embodiment suitably interconnected in accordance with the invention described in the above-referenced patent.

According to another aspect of the present invention, in a multiple axis machine tool system, the coordinate data stored in association with each SEQUENCE is in absolute form, representative of the coordinate values of the associated spatial point, so that any of the programmed SEQUENCES may be selected by the operator in the RUN mode as a current SEQUENCE. Means is provided so that in response to the selection of any SEQUENCE, in or out of order, the cutting element is directed to the same spatial point as it would have been if the current SEQUENCE had been selected through the ordered stepping through the succession of SEQUENCES. For example, for a machine having X, Y and Z axes, such as that described in U.S. Pat. No. 3,878,983, when a two coordinate (e.g. X-Y) SEQUENCE is selected as current, the cutting element is directed first to a reference coordinate along the Z axis, and then to the two coordinates (X and Y) stored in association with the current SEQUENCE, and finally to the one coordinate (Z) stored in association with the next previous one coordinate (e.g. Z) SEQUENCE in the succession of SEQUENCES stored in the computer memory. When a one coordinate SEQUENCE is selected as current, the cutting element is directed first to a reference coordinate along the one coordinate axis, then to the two coordinates associated with the next previous two coordinate SEQUENCE in the succession, and finally to the single one coordinate stored in association with the current SEQUENCE.

The present invention also includes a further aid for the operator in entering the ordered succession of SEQUENCES to be stored in a computer memory. More particularly, for an embodiment of the present invention which includes the embodiment described in the above-referenced U.S. Pat. No. 3,878,983, the operator may selectively activate in the PROGRAM-EDIT mode a data entry control to be either in ABSOLUTE or INCREMENTAL position. When in the ABSOLUTE position, the operator may enter data SEQUENCE storage in absolute form. The data is then stored in that form in the computer memory. When the data entry control is in the INCREMENTAL position, the operator may enter the data for SEQUENCE generation in incremental format. In response to the entry of such data in the incremental format, the computer transforms that data to absolute data before storing the latter in the data computer memory.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
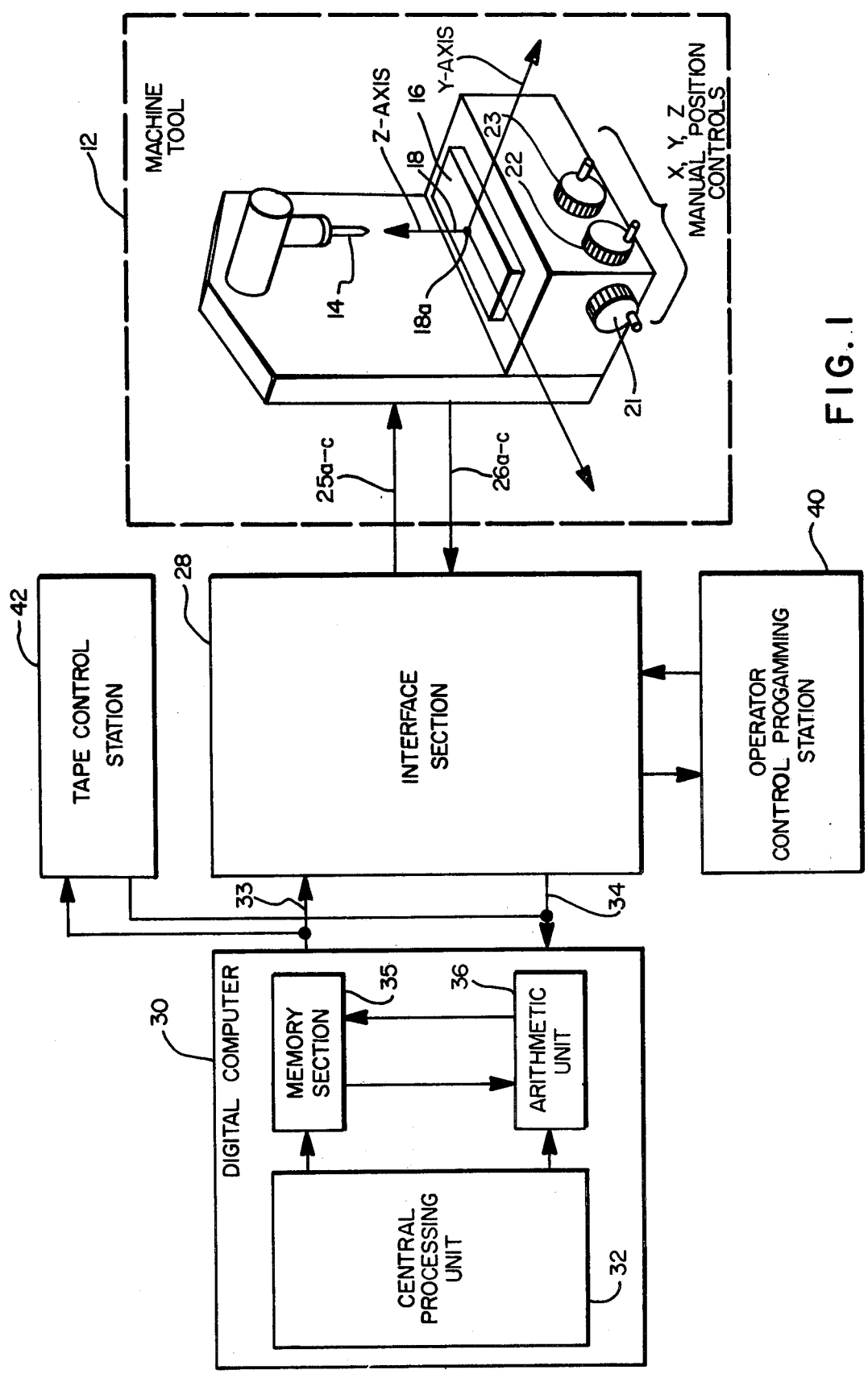
FIG. 1 shows in block diagram form, a numerically controlled machine tool system in accordance with the present invention.

The presently-described embodiment includes that system described in the above-referenced U.S. Pat. No. 3,878,983, incorporated by reference herein. Accordingly, FIGS. 1-3 from that patent are also used herein to depict an embodiment of the present invention. Reference numerals used for identifying various components of the referenced patent are used herein to identify corresponding components of the present embodiment.

Figure 4:
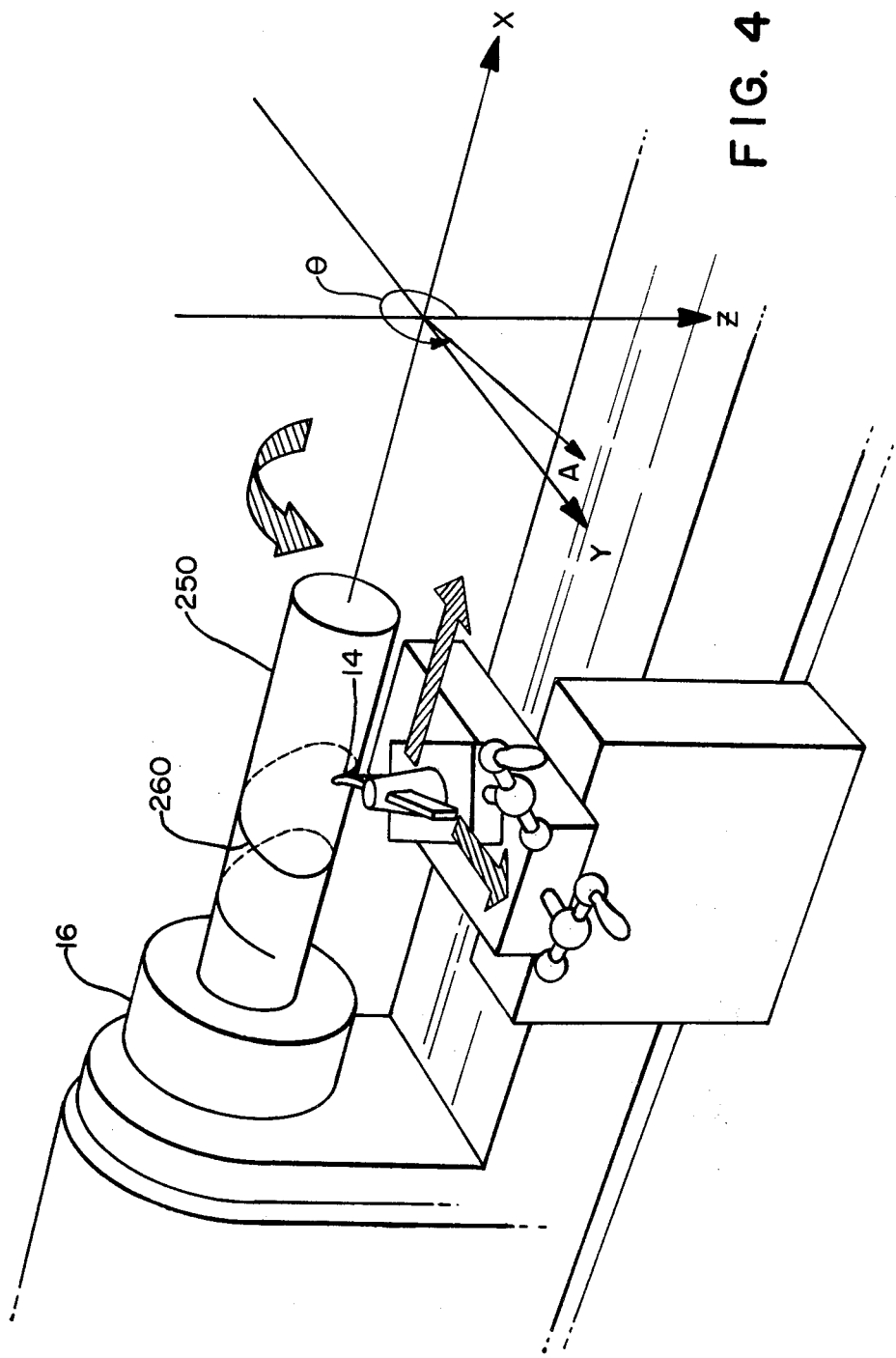
FIG. 4 shows an alternative embodiment of the present invention.

The embodiment illustrated in FIG. 1 is that of a milling or a grinding machine tool as connected to the control means of the present invention. In this particular embodiment, the workpiece positioning table 16 may be translated in the horizontal X-Y plane, while the cutting element 14 is arranged to rotate about a vertical axis perpendicular to that X-Y plane and to reciprocate along that vertical axis in the Z direction. In addition, the table 16 may be rotated about the Z axis. In other embodiments, the table 16 may be configured to be rotated about the X or Y axes. Of course, as noted in the incorporated reference, still other machine tools may be embodied in accordance both with the prior invention and with the present invention. More particularly, a lathe embodiment may be utilized wherein the workpiece is supported along and rotated about an axis in a first direction while a cutting element is suitably controlled to be positioned both in a plane perpendicular to that axis and along that axis relative to the workpiece. For example, as shown in FIG. 4, the workpiece 250 and its supporting table 16 may be rotated about the X axis (denoted as the A axis degree of freedom) while the cutting element is moved in the X-Y plane. The angular displacement of the A axis about the X axis with respect to a reference axis in the Y-Z plane is denoted by $\theta$. Of course, other numerically controlled machine tool configurations may also be utilized in accordance with the principles of both the present invention and referenced patent.

The present embodiment of FIG. 4 utilizes stepping motors for controlling X, Y and Z axes motion as described in the above-referenced application, (using a series of major, and minor moves to accommodate the programmed feed rates and paths) and further utilizes a constant speed motor for controlling rotation about the X axis (A axis motion). In this configuration, for X-A SEQUENCES (e.g. helical SEQUENCES), A axis motion is directed continuously while a series of X major moves are directed at appropriate times to achieve the programmed feed rate and path. Of course, in other embodiments, similar configurations may readily be implemented for other axes.

Figure 2:
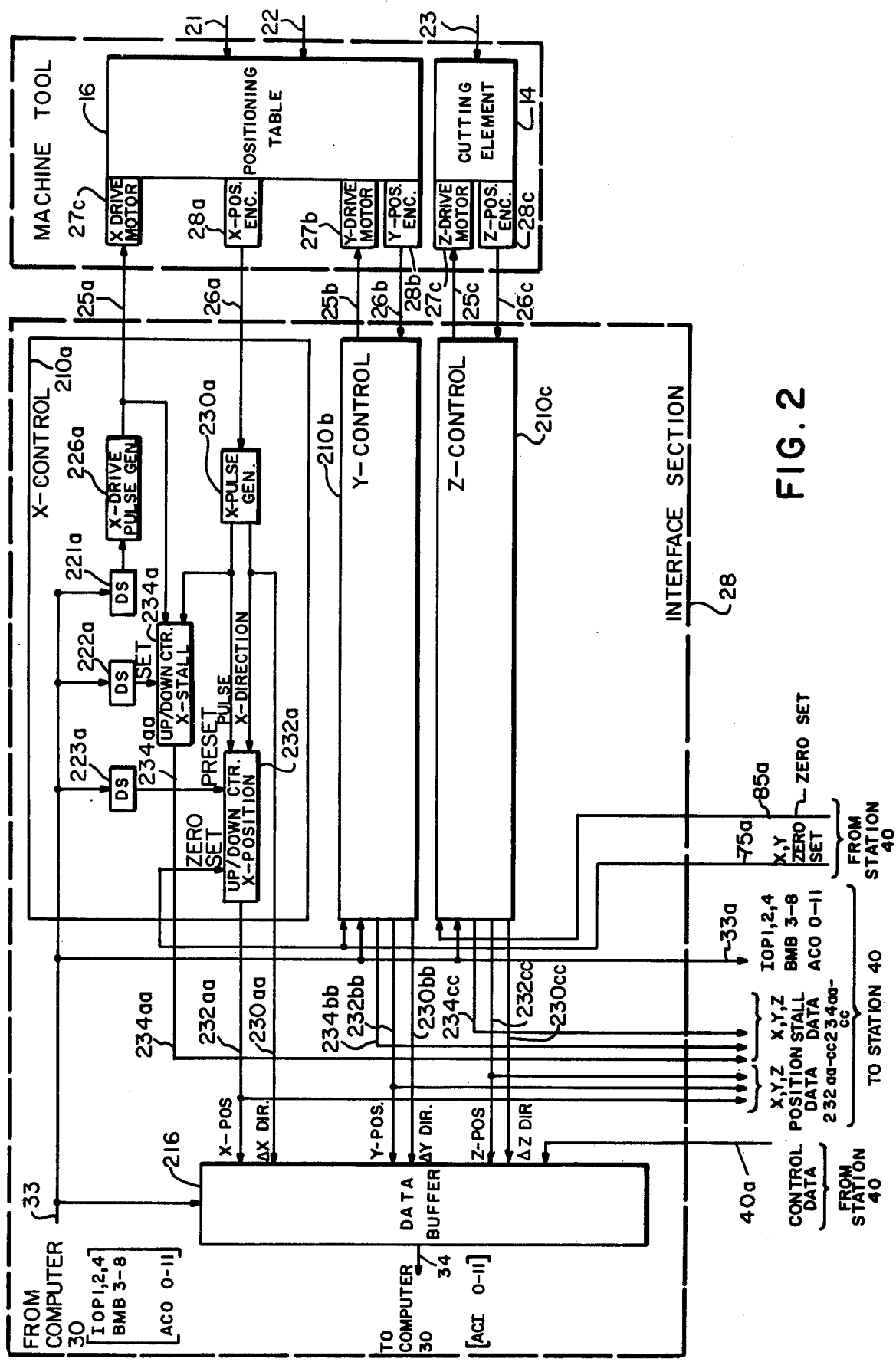
FIG. 2 shows in block diagram form a machine tool and interface section of FIG. 1.
Figure 3:
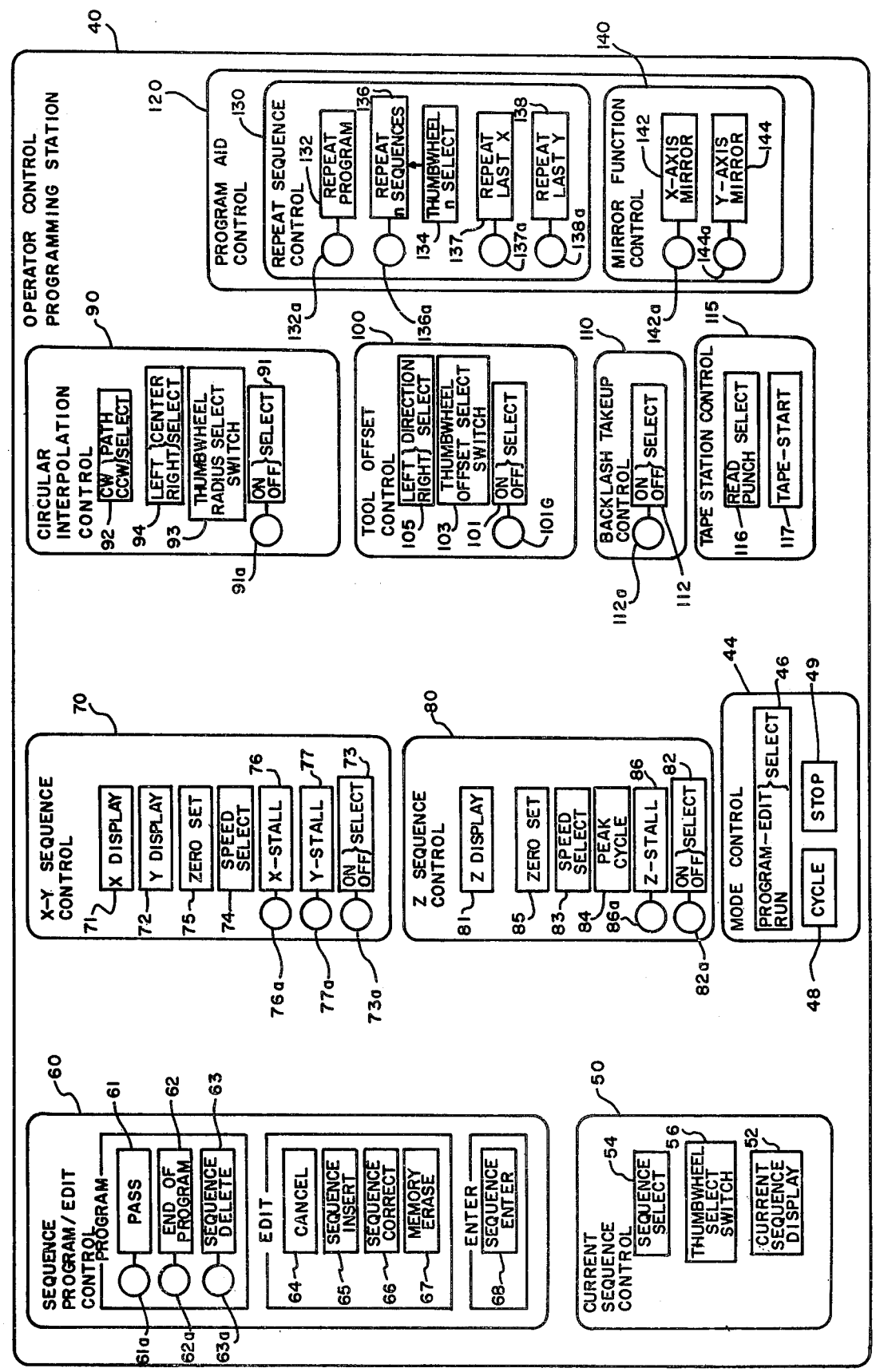
FIG. 3 shows a plan view of a portion of the operator control panel for use with the operator control/programming station of FIG. 1.

In the present embodiments, all the components of the embodiment of FIGS. 1-3 may be the same as those in the incorporated reference, with the exception that the X-Y SEQUENCE select 73 and speed select 74 include independent switches for each of the X and Y axes. With respect to FIG. 5, it will be understood that the electronic circuitry included in each block of that figure is comprised of well-known circuit elements including: integrated circuits (flip-flops, shift registers, counters and logic gates), resistors, capacitors, push button and thumb wheel switches, indicator lamps and display devices. These devices are configured in a well-known manner to perform the hereafter-described functional operations. More particularly, as with the embodiment of the referenced patent, interface circuits associated with computer 30 are configured in accordance with the well-known interface techniques described in the Digital Equipment Corporation's PDP-8/L User's Handbook.

Figure 5:
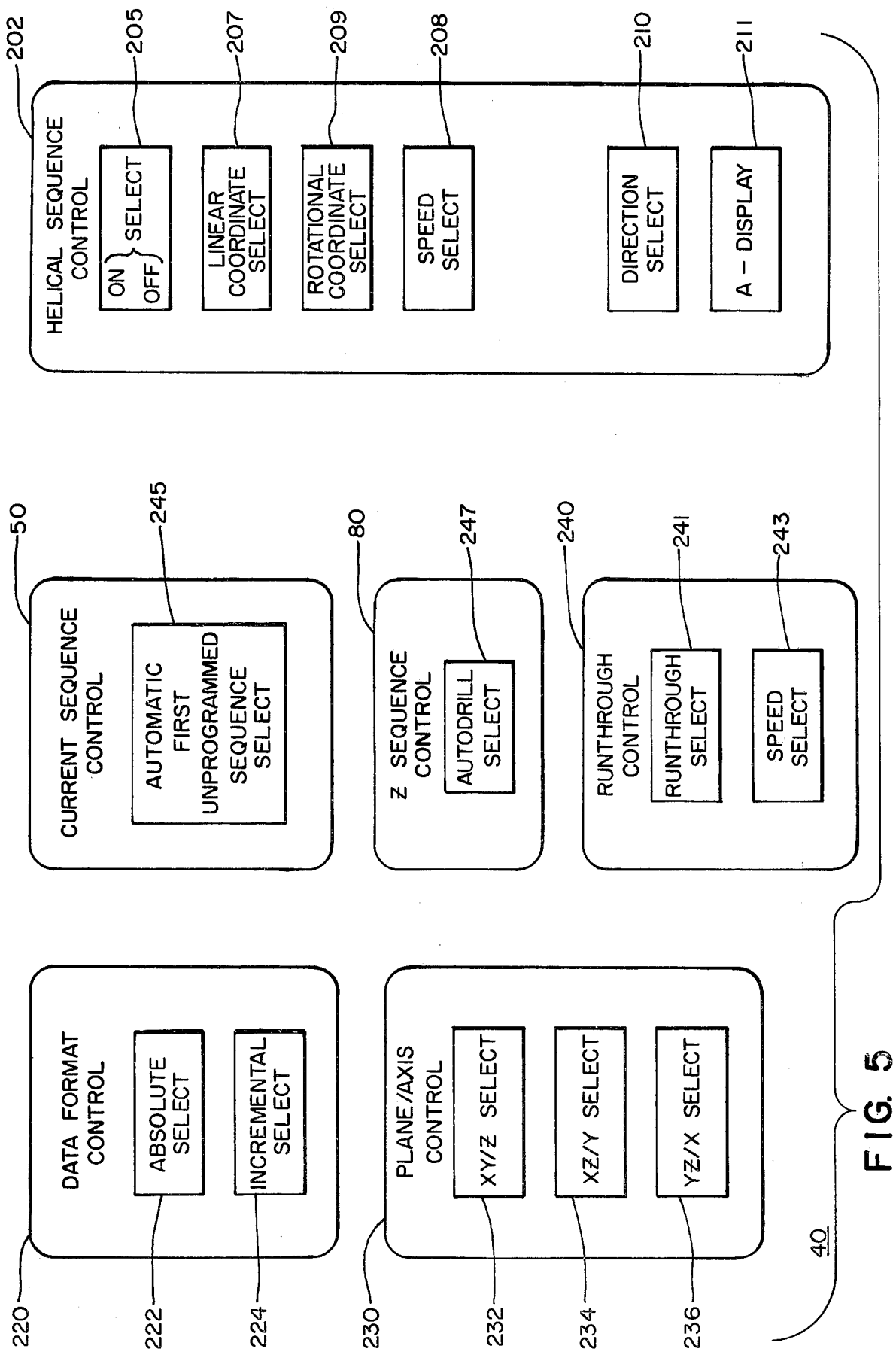
FIG. 5 shows a plan view of a further portion of the operator control panel for the operator control/programming station of FIG. 1.

In addition to these elements shown in FIG. 3, the operator control/programming station 40 further comprises HELICAL SEQUENCE CONTROL 202 (including select means 207–210, and display 211), DATA FORMAT CONTROL 220 (including select means 222 and 224), PLANE/AXIS CONTROL 230 (including select means 232, 234 and 236), RUNTHROUGH CONTROL 240 (including select means 241 and 243), all shown in FIG. 5. In addition, the CURRENT SEQUENCE control 50 (FIG. 3) includes automatic first unprogrammed SEQUENCE select control 245, and the Z SEQUENCE CONTROL 80 (FIG. 3) includes autodrill select control 247.

The helical SEQUENCE control 202 includes select contols 207–210 for entering data suitable for defining a desired helical path and for defining a desired feed rate along the helical path. These controls 207–210 may be of the push button or thumb wheel select type. Alternatively, a keyboard may be utilized in conjunction with a data entry push button switch. Display 211 provides a visual output signal representative of the current angular displacement, $\theta$, of the A axis. The speed select 243 associated with the runthrough control 240 may also be similarly configured. All of these elements 207–210 and 243 include a single or multiple bit data register which may be loaded in response to signals generated by their associated operator controlled push button (or thumb wheel) switches at station 40. All of these registers may be simultaneously cleared by an operator-push button generated CANCEL signal, or by an appropriate computer command signal in a similar manner to the blocks in FIG. 3 as described in column 17 of the incorporated reference. In other embodiments individual CANCEL signals may be generated by the operator for cleaning selected individual registers.

The data outputs of each register is applied by way of line 40a to data buffer 216 for transferral upon command to the accumulator of computer 30. The other select means shown in FIG. 5 (i.e. blocks 205, 222, 224, 232, 234, 245, 247 and 241) are similarly configured but are arranged to accommodate single bit data representative of the ON or OFF position of their associated switch. Of course, in other embodiments, suitable decode and display devices may be utilized to display to the operator any of the signals entered by these controls.

At this point, it will be assumed that all of the blocks shown in FIGS. 3 and 5 have the appropriate switches, data registers, decoding and logic networks and interconnecting signal lines to accomplish the functional description that follows.

The digital computer 30 for an embodiment of this invention may be programmed in accordance with the computer program set forth in Appendix I of parent application Ser. No. 652,143 now U.S. Pat. No. 3,878,983. This embodiment includes all of the features described in the referenced patent. The further controls for the operator control programming station 40 which are necessary to implement the functions performed by the present embodiment are shown in FIG. 5. The function of these controls and the interaction with the programmed digital computer 30 will now be described. It will be understood that in this embodiment, each of the axes may be individually programmed for single coordinate SEQUENCES or jointly programmed for two coordinate SEQUENCES.

In addition to the method for selecting a SEQUENCE to be programmed described in the incorporated reference, in accordance with the present invention, the operator may also activate the automatic first unprogrammed SEQUENCE select control 245 in the PROGRAM-EDIT mode. In response thereto, the digital computer 30 automatically selects as the CURRENT SEQUENCE, the next available SEQUENCE number which has no associated previously stored program data. The number of this SEQUENCE is displayed in current SEQUENCE display 52 and thereafter the operator may program the SEQUENCE in the normal manner, described in conjunction with the incorporated reference.

Figure 6:
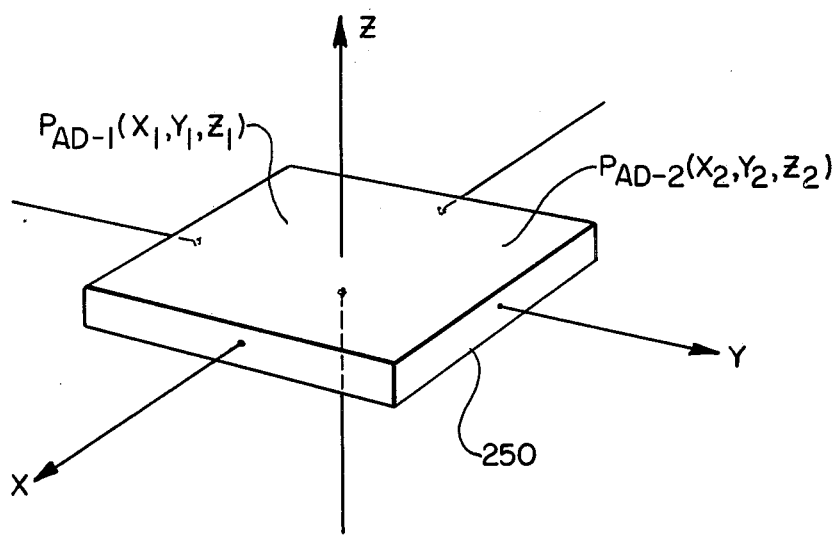
FIG. 6 shows an exemplary trajectory of the relative motion of the cutting element of FIG. 1 in response to an exemplary AUTODRILL SEQUENCE.

In the PROGRAM-EDIT mode, the operator may establish an AUTODRILL SEQUENCE by activating the autodrill select control 247 in conjunction with the programming of a current Z SEQUENCE. For example, in FIG. 6, a workpiece 250 is shown positioned with respect to X, Y and Z axes. In this example, it is assumed that a hole is desired at point $P_{AD-1}$ having coordinates $(X_1, Y_1, Z_1)$, and a second and identical hole is desired at the point $P_{AD-2}$ having coordinates $(X_2, Y_2, Z_2)$. In the PROGRAM-EDIT mode, the operator may first program a suitable succession of sequences to drill the desired hole at $P_{AD-1}$ using either a PECK CYCLE Z SEQUENCE pair or a pair of Z SEQUENCES directing the cutting element in the negative Z direction for the desired distance in association with the first SEQUENCE, and in the positive Z direction in association with the second SEQUENCE of the pair. Following the entry of one of these pairs of SEQUENCES via the SEQUENCE ENTER control 68, the operator may manually adjust the cutting element to point $P_{AD-2}$, activate autodrill select control 247, and then activate the SEQUENCE ENTER control 68. As a result, a single AUTODRILL SEQUENCE is stored in the computer memory whereby X-Y coordinate data representative of $P_{AD-2}$ is stored at the memory locations associated with the $P_{AD-2}$ SEQUENCE along with an AUTODRILL SEQUENCE identifier data word. Subsequently, when the AUTODRILL SEQUENCE is the current SEQUENCE in the RUN mode, computer 30 will identify this AUTODRILL SEQUENCE, and direct the cutting element first to the X, Y coordinates associated with the AUTODRILL SEQUENCE, and then direct the cutting element in the same motions that were specified in conjunction with the normal Z SEQUENCE pair stored in association with $P_{AD-1}$.

The operator may also in the PROGRAM-EDIT mode operate the plane/axis control 230 to establish cutting element motion in the direction of a selected axis or in a selected two coordinate plane. To program a one coordinate (X, Y or Z) SEQUENCE for directing motion along a selected axis, the operator may manually direct cutting element to a desired spatial point, and then set the X, Y or Z select switch, as desired, set a desired speed, set the appropriate one of the switches 236, 234 or 232 of plane/axis control 230, (thereby generating an X, Y or Z SEQUENCE tag to be stored with the SEQUENCE data), followed by the activation of SEQUENCE ENTER control 68. To generate a two coordinate (X-Y, X-Z or Y-Z) SEQUENCE, the operator may direct the cutting element to the desired point, and then set the two of the X, Y and Z select switches which are associated with the desired two coordinate axes, set the appropriate speed select controls, set the one of plane select controls 232, 234 or 236, corresponding to the desired X-Y, X-Z or Y-Z plane (thereby generating an X-Y, or X-Z or Y-Z SEQUENCE tag to be stored with the SEQUENCE data), followed by the activation of SEQUENCE ENTER control 68. If a circular motion is desired in the selected plane, the circular interpolation control 90 may be appropriately activated in conjunction with the data entry for the SEQUENCE currently being programmed. For either one or two coordinate SEQUENCES, if desired, the operator may omit the step of manually positioning the cutting element to the spatial point, if the coordinates of that point are entered by way of a keyboard entry means or equivalent.

In the RUN mode, the computer detects and identifies the plane/axis tag associated with a current SEQUENCE before generating axis drive signals. For the case of a one coordinate SEQUENCE, the one coordinate axis drive signals are generated and applied to the drive motor associated with the one coordinate tag axis. For a two coordinate SEQUENCE, having no circular interpolation tag, the computer utilizes the coordinate data stored in association with the current SEQUENCE to generate a corresponding series of two coordinate axis drive signals in accordance with the best straight line algorithm defined in the referenced patent. For a two coordinate SEQUENCE, having a circular interpolation tag, the computer utilizes the data stored in association with the current SEQUENCE to generate two coordinate axis drive signals in accordance with the circular interpolation algorithm as described in the referenced patent. In both of these cases, the resultant series of drive signals are applied to the drive motors means associated with the two coordinate tag axis in order to drive the cutting element along either the best straight line, or along the circular path in the specified plane.

Figure 7:
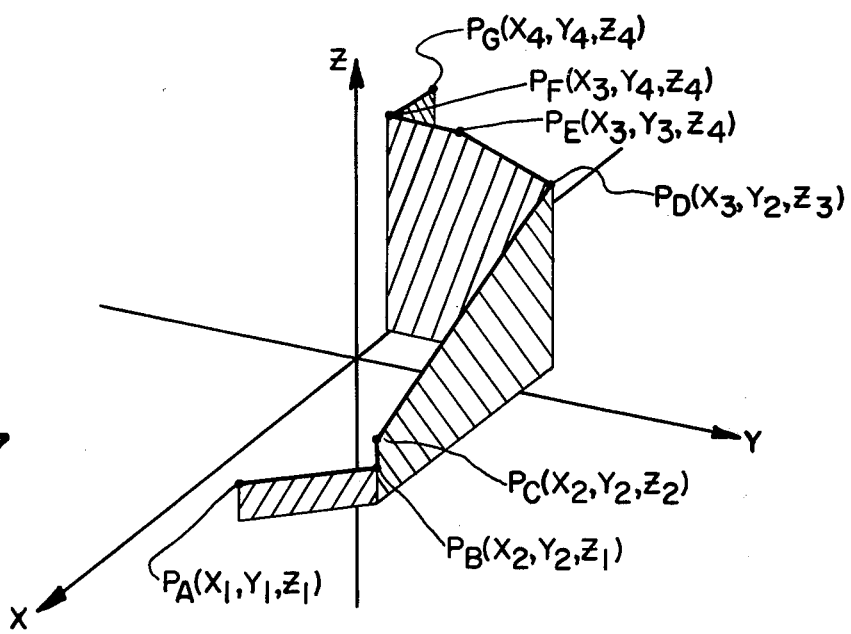
FIG. 7 shows an exemplary machine point for the cutting element of FIG. 1 in response to exemplary X-Y, Y-Z and X-Z PLANE SEQUENCES.

FIG. 7 illustrates an exemplary machine tool path with reference to an X, Y, Z coordinate system. As shown in FIG. 7, the spatial points $P_A$–$P_G$ illustrate the desired spatial points through which the cutting element is to pass from the initial point $P_A$ characterized by coordinates $X_1$, $Y_1$, $Z_1$. The solid lines interconnecting the various points $P_A$–$P_G$ are representative of the cutting element path. The diagonally shaded areas are representative of planes which aid in illustrating the path followed by the cutting element, and otherwise these planes have no significance.

Table I illustrates the one coordinate and two coordinate SEQUENCES which are required to drive the cutting element from the initial point $P_A$ to the final point $P_G$ in FIG. 7. In the first column of Table I, $SEQ_{AB}$, $SEQ_{BC}$, $SEQ_{CD}$, $SEQ_{DE}$, $SEQ_{EF}$, and $SEQ_{FG}$ represent the SEQUENCES required for directing motion between points A and B, B and C, C and D, D and E, E and F and F and G, respectively. The second column represents the plane of motion or axis direction of motion, for the respective SEQUENCES of column 1. The third column indicates the coordinate values stored in association with the SEQUENCES of column 1 and the remaining columns indicate the binary state of select switches 232, 234 and 236 during the programming of the SEQUENCES of column 1.

TABLE I

| SEQUENCE | Initial Point: $P_A(X_1, Y_1, Z_1)$ | | XY/Z | XZ/Y | YZ/X |
|---|---|---|---|---|---|
| | PLANE/AXIS | STORED COORDINATES | | | |
| $SEQ_{AB}$ | X-Y | $X_2, Y_2$ | 1 | 0 | 0 |
| $SEQ_{BC}$ | Z | $Z_2$ | 1 | 0 | 0 |
| $SEQ_{CD}$ | X-Z | $X_3, Z_3$ | 0 | 1 | 0 |
| $SEQ_{DE}$ | Y-Z | $Y_3, Z_4$ | 0 | 0 | 1 |
| $SEQ_{EF}$ | Y | $Y_4$ | 0 | 1 | 0 |
| $SEQ_{FG}$ | X | $X_4$ | 0 | 0 | 1 |

In this example, the first sequence, $SEQ_{AB}$ is a two coordinate (X-Y) SEQUENCE and directs cutting element motion parallel to the X-Y plane from point A to B. The SEQUENCE $SEQ_{BC}$ is a one coordinate (Z) SEQUENCE, and directs single coordinate motion in a direction parallel to the Z axis from points $P_B$ to $P_C$. Similarly, the remaining SEQUENCES produce cutting element motion along the solid line connecting points $P_B$, $P_C$, $P_E$, $P_F$ and $P_G$.

While the above illustrated operation of plane/axis control 230 shows operations for X, Y and Z coordinate systems, it will be understood that a further plane/axis control select may be utilized for systems having additional axes, such as a rotational axis. In such systems, for example, as described below in conjunction with HELICAL SEQUENCE control 202, for a system as shown in FIG. 4 having X, Y and Z axes and a rotational A axis (for rotation about the X axis), the select control 205 establishes a HELICAL (X-A) SEQUENCE as described below. In the RUN mode, the computer generates a series of X and A axis drive signals in accordance with the best straight line algorithm and applies those signals to the respective X and A axis motors to direct cutting element motion along a helical path about the X axis. It will be understood that the latter signals would result in straight line motion in the X-A plane if the A axis was linear instead of rotational.

As noted above, the operator may also program a helical path to be followed by the cutting element with respect to the workpiece by activation of the controls in HELICAL SEQUENCE control 202. It will be understood that this mode of operation may be established by the milling or grinding machine tool (as shown in FIG. 1) by rotating the positioning table and the workpiece attached thereto about the Z axis (with the angle of rotation $\theta$ of the table with respect to a reference axis in the X-Y plane being a measure of the A-axis displacement) while translating a suitable cutting element 14 (such as a right angle head element) along the direction parallel to the Z axis but offset from the Z axis by a predetermined distance R. The lathe embodiment shown in FIG. 4 is also suitable, and in many applications more suitable for establishing this helical path for the cutting element. In such an embodiment, the cutting element may be controlled to move in the X direction at a predetermined distance R from the rotational axis of the workpiece (i.e. the X axis), while the workpiece is rotated about the X axis. Of course, in this latter embodiment, the cutting element may be controlled to be different distances from the rotational axis of the workpiece in order to achieve different radius helical paths, and also the cutting element may be fixed along the X axis while the workpiece is translated along that axis. Furthermore, a suitable cutting element may also be adapted for rotational motion in this embodiment.

In the presently-described embodiment with the lathe of FIG. 4, a helical path is programmed by the storing of a HELICAL (X-A) SEQUENCE pair, with the first SEQUENCE of the pair including data representative of the X and A axis coordinates of the initial point of the helical path ($X=X_1$ and $\theta=\theta_o$). The radius of the helical path $R_o$ is implicitly defined by the coordinate of the next previous SEQUENCE in the stored succession. In alternative embodiments, a helix radius may be explicitly programmed with a suitable select control. The first SEQUENCE further includes data representative of a desired feed rate at which the cutting element is to approach the initial point.

The second SEQUENCE of the pair specifies the final point of the helix (in terms of data representative of the X and A coordinates of the final point of the helical path) and desired feedrate or speed along the path. In other embodiments, different SEQUENCE formats may be used.

In entering a HELICAL SEQUENCE pair, the operator specifies a desired helical path (e.g. path 260 in FIG. 8) by manually directing the cutting element to the desired initial coordinates of the helix, and then activating switch 205 (to specify an X-A SEQUENCE and store a HELICAL SEQUENCE identifying word) switch 208 (to specify approach feedrate), and SEQUENCE ENTER control 68 to generate the first SEQUENCE of the HELICAL SEQUENCE pair. The operator may then position the cutting element to the final point of the desired helix (to specify the helix direction and final X and A coordinate values), activate speed select 208, and finally SEQUENCE ENTER control 68 to generate the second of the HELICAL SEQUENCE pair. Alternatively, the operator may enter the final X coordinate by way of the thumbwheel switch (or equivalent) associated with linear coordinate select 207 (represented by the distance of the final point from the origin L along the helix axis), the final A coordinate by way of the thumbwheel switch associated with rotational coordinate select 209 (represented by D, the product of the helix density (number of revolutions per unit length) times 360 degrees times L) and the helix direction by way of direction select 210. Thumbwheel or keyboard switches could also be utilized to generate signals representative of desired initial coordinate data, in lieu of the manual direction operation. Following the activation of controls 207-210, the activation of SEQUENCE enter control 68 stores the second SEQUENCE of the pair. This second of the HELICAL SEQUENCE pair is suitable for use with an embodiment wherein the A axis motion, as well as X, Y and Z motion is controlled by stepping motors using the major and minor move and best straight line algorithm described in the U.S. Pat. No. 3,878,983. Alternatively, where the A axis is controlled to move at constant speed, while the X, Y and Z axis motions are controlled with stepping motors, the X axis motion may be directed with X axis major moves which are suitably spaced in time to achieve the desired feedrate and path. In this latter type embodiment, the second of the HELICAL SEQUENCE pair only requires helix density data instead of D and L data.

Figure 8:
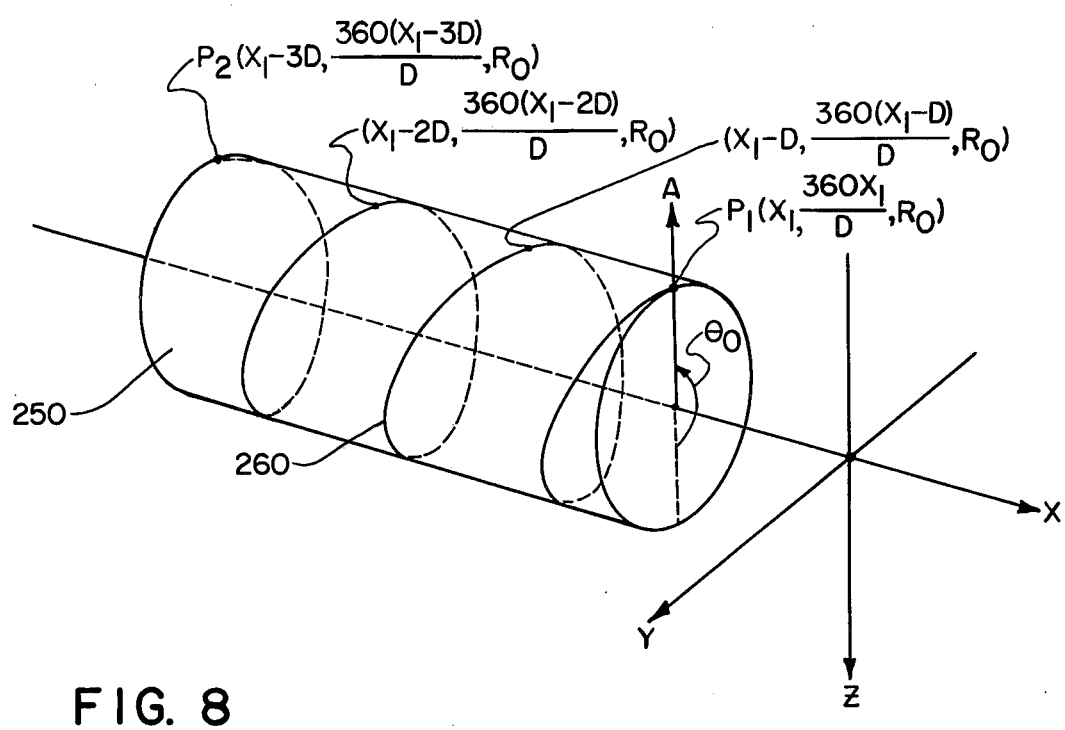
FIG. 8 shows an exemplary trajectory of the relative motion of the cutting element of FIG. 1 in response to an exemplary HELICAL SEQUENCE pair.

FIG. 8 shows an exemplary helical path 260 on a workpiece 250 which commences at initial point $P_1$ in the plane $X=X_1$ (i.e. L equals X), and lying at a distance $R_o$ from the X axis in the direction of the Z axis. The path 260 continues counterclockwise from the origin of the X, Y and Z axes (positive $\theta$) in the negative X direction and extends three full revolutions about the X axis, with a distance D per revolution along that axis, i.e. the helix density equals 1/D. Accordingly, $P_1$ is characterized by X-A-Z coordinates $(X_1, 360X_1/D, R_o)$. As shown in FIG. 8, path 260 passes through the intermediate X-A-Z points $(X_1-D, 360(X_1-D)/D, R_o)$ and $(X_1- 2D, 360(X_1-2D)/D, R_o)$ and the final point $P_2$ $(X_1-3D, 360(X_1-3D)/D, R_o)$.

To program such a path for a system using D and L data, following a Y SEQUENCE with associated coordinate $Y=R_o$, the operator first directs the cutting element to be positioned at point $P_1$, activates X-A SEQUENCE select control 205, selects the desired initial point approach feedrate via switch 208, and then activates SEQUENCE ENTER control 68 to store the first of the HELICAL SEQUENCE pair. The operator may then program the second HELICAL SEQUENCE of the pair by storing the helix final point X axis coordinate, L, by appropriately setting a thumbwheel (or equivalent) selector associated with control 207 to the value $X_1-3D$, and the final point A axis coordinate, D, by way of the thumbwheel selector associated with control 209 (e.g. 1 revolution/D unit lengths times 360 degrees/revolution times $(X_1-3D)$ unit lengths, or $360/D (X_1-3D)$ degrees), the desired feed rate via the thumbwheel selector associated with control 208, the counterclockwise direction by the appropriate positioning of the switch associated with control 210, and, by finally activating the SEQUENCE ENTER control 68.

In the RUN mode, when the first of the HELICAL SEQUENCE pair is the current SEQUENCE, the computer identifies the SEQUENCE as a HELICAL SEQUENCE and the cutting element is driven to point $P_1$. Then the second of the pair becomes the current SEQUENCE and the computer identifies that SEQUENCE as a HELICAL SEQUENCE via the identifying data word and then generates appropriate motion command signals to rotate the workpiece and translate the cutting element to establish the programmed motion along the helical path 260. The motion command signals are generated for the X and A axis drive motors in a similar manner as for the X and Y axis drive motors as described in the referenced patent, that is, a series of X major, A major, X-A minor moves and zero moves are established in order to achieve the best line in the X-A plane at the programmed feed rate. In alternate embodiments, the workpiece rotational axes (e.g. the X axis in FIG. 4) may be angularly displaced from the helix axis (which remains fixed in space) in order to generate a tapered helical path on the workpiece.

In certain applications, the desired cutting element relative path may comprise a pair of helical paths at adjacent locations along the X axis (of the FIG. 4 embodiment, for example), having identical radii but differing densities (numbers of revolutions per unit length along the X axis). A HELICAL TRANSITION SEQUENCE pair may be generated for establishing transition cutting element motion between the two helical paths for which no step accelerations are required. For example, as depicted in the X-A plane of FIG. 9, two general helical paths $S_1$ and $S_2$, may be joined in continuous fashion at points $P_1 (X_1, A_1)$ and $P_2 (X_2, A_2)$ (and where dA/dX at $P_1$ and $P_2$ are equal for the joined paths) by the circular arc segment $S_3$ having a radius R, center $P_3$ and a slope tan $\alpha$ at $P_1$ and slope tan $\beta$ at $P_2$. In that figure, $S_1$ and $S_2$ may be respectively represented by the equations:

$$A_{S_1} = (\tan \alpha) X + C_1, \text{ and}$$
$$A_{S_2} = (\tan \beta) X + C_2$$

where $\alpha$ and $\beta$ are the respective angles formed by $S_1$ and $S_2$ with the X axis, and $C_1$ and $C_2$ are the respective A axis intercepts. The radius R is determined according to the formula:

$$R = \frac{\frac{1}{2} \cdot \sqrt{(\Delta A)^2 + (\Delta X)^2}}{\cos(90 - (\frac{\alpha - \beta}{2}))}$$

where $\Delta A = A_2 - A_1$ and $\Delta X = X_2 - X_1$, where $\Delta A$ and $\Delta X$ are related by the formula:

$$\frac{\Delta A}{\Delta X} = \tan(\frac{\alpha + \beta}{2}).$$

Accordingly, the operator programs a path comprising two helical path segments such as $S_1$ and $S_2$ with a circular arc (in the X-A plane) joinder path such as $S_3$ by initially generating the appropriate HELICAL SEQUENCE pair for $S_1$, and then specifying a desired $\Delta X$ (or $\Delta A$) and computing R, and then generating and storing a HELICAL TRANSITION SEQUENCE pair for $S_3$, and finally generating an appropriate HELICAL SEQUENCE pair for $S_2$. To generate and store the TRANSITION SEQUENCE pair, the operator may first manually direct the cutting element to the point $P_1$, and then activate HELICAL SEQUENCE select control 205 followed by SEQUENCE ENTER control 68, thereby storing initial coordinate data $X_1$ and $A_1$. However, the resultant SEQUENCE is identical to the second of the HELICAL SEQUENCES which define $S_1$. Accordingly, the operator may omit this first at the TRANSITION SEQUENCE pair with the result that the second of the two $S_1$ HELICAL SEQUENCE pair series as the first of the TRANSITION SEQUENCE pair. In the present embodiment, when there are intervening SEQUENCES between the $S_1$ SEQUENCE pair and the second of the TRANSITION SEQUENCE pair, the first of the TRANSITION SEQUENCE pair must be entered.

Figure 9:
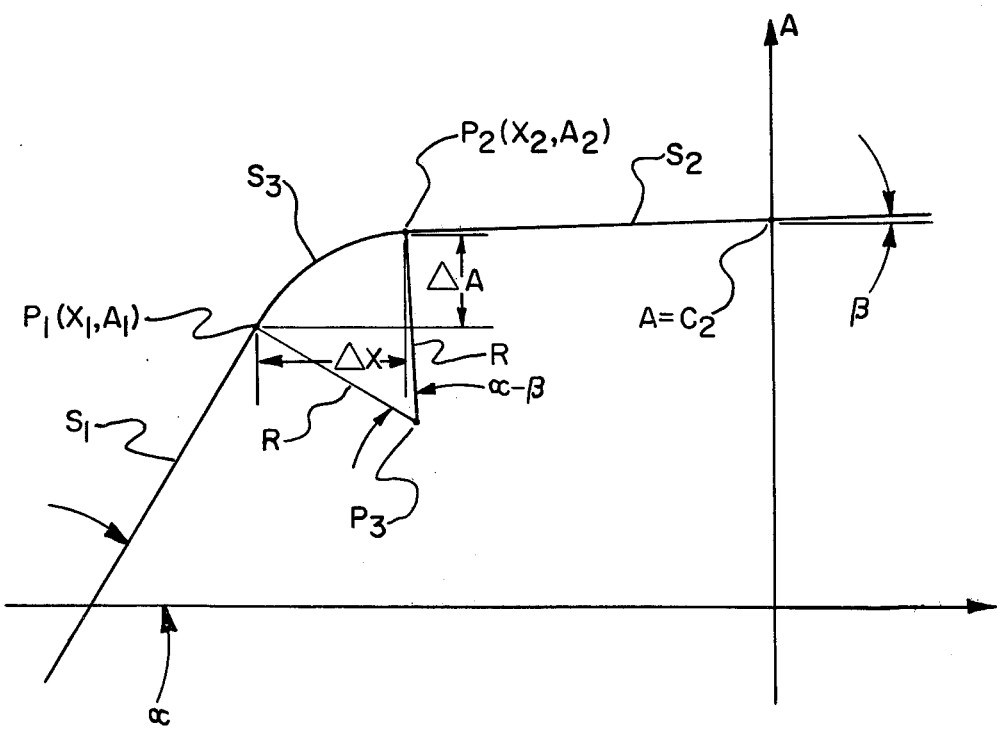
FIG. 9 shows an exemplary trajectory in the X-A plane for two helical path segments joined by a circular arc path segment.

The operator may open into the second of the TRANSITION SEQUENCE pair by directing the cutting element to arc end point $P_2$ and activating both the HELICAL SEQUENCE select control 205 and CIRCULAR INTERPOLATION select control 91 followed by activation of path select control 92, center select control 94, radius select control 93, speed (feedrate) select, control 208 and finally SEQUENCE ENTER control 68, thereby storing circular arc path direction and center data as may be determined from FIG. 9, circular radius data as determined from the above formula, and desired feedrate data. In the RUN mode, the computer identifies the HELICAL SEQUENCES for $S_1$ and $S_2$ as described above and directs the cutting element path to follow $S_1$ and $S_2$ respectively when the corresponding SEQUENCES are current. When the second SEQUENCE of the TRANSITION SEQUENCE pair is current, the computer generates X and A axis drive signals in a manner similar to that for the X and Y axis drive signals described in the referenced patent in conjunction with the circular interpolation control, with the A axis merely substituting for the Y axis. Following, this operation, the HELICAL SEQUENCE pair for $S_3$ controls the cutting element motion.

Figure 10:
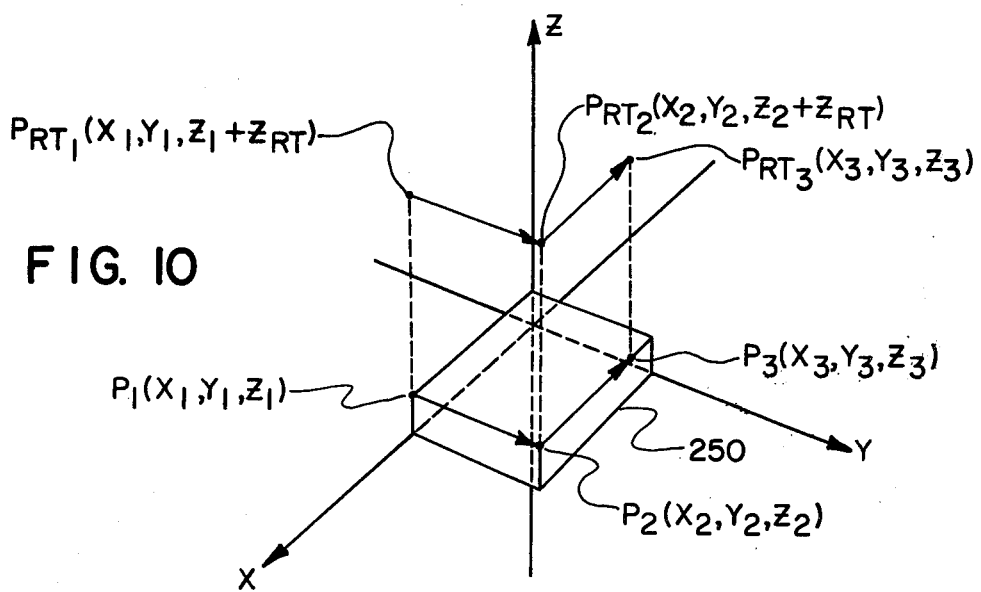
FIG. 10 shows an exemplary trajectory of the relative motion of the cutting element of FIG. 1 in response to the RUNTHROUGH control for exemplary X-Y SEQUENCES.

The operator may also direct a rapid rate runthrough of the points programmed at a predetermined distance from the workpiece to aid in his programming operation. By way of example, an exemplary runthrough path is illustrated in FIG. 10 in conjunction with a workpiece 250 wherein a succession of SEQUENCES are assumed to establish cutting element motion connecting points $P_1$ ($X_1$, $Y_1$, $Z_1$), $P_2$ ($X_2$, $Y_2$, $Z_2$) and $P_3$ ($X_3$, $Y_3$, $Z_3$) in straight line paths (where in the illustration $Z_1 = Z_2 = Z_3$). Using runthrough control 240 in the RUN mode, the operator may direct cutting element 14 to pass through the respective points $P_{RT-1}$, $P_{RT-2}$ and $P_{RT-3}$, which points correspond to the points $P_1$, $P_2$ and $P_3$, respectively, except that the Z coordinate is displaced by a predetermined constant $Z_{RT}$. For the present embodiment, to establish such motion, the operator may first manually displace the workpiece in the Z direction by offset distance $Z_{RT}$, then select the RUN mode, select the SEQUENCE associated with $P_1$ as the current SEQUENCE, activate the runthrough select control 241, select a desired runthrough speed (by way of the speed select control 243) and finally activate the CYCLE control. As a result, the computer performs the runthrough operation by directing the cutting element along the straight line path connecting points $P_{RT-1}$, $P_{RT-2}$, and $P_{RT-3}$, as shown in FIG. 10, at the runthrough feedrate, rather than in accordance with the feedrate data stored in association with the SEQUENCES. In alternative embodiments, a predetermined value for $Z_{RT}$ may be stored by the computer for automatic selection in response to activation of control 240.

In all of the above operations and in conjunction with the programming operations performed in accordance with the incorporated reference, the operator may activate the data format control 220 by selecting either the absolute control 222 or the incremental control 224 to that the data entered via the thumbwheel switches associated with various data entry means may be performed in either absolute or incremental form, respectively. It will be understood that in accordance with the present invention, the data is stored in all cases in the computer 30 memory in absolute form. Accordingly, when the incremental select control 224 is activated, the subsequently entered data is first transformed to absolute form before being stored in association with the respective SEQUENCES. As a result, the operator may at any time select any SEQUENCE and the machine operation associated therewith may be performed in the RUN mode based on the current cutting element position and without reference to a preceding machine operation.

In a multiple axis machine tool system in accordance with the present embodiments, the coordinate data stored in association with each SEQUENCE is in absolute form, representative of the coordinate values of the associated spatial point. As a consequence, any of the programmed SEQUENCES may be selected by the operator in the RUN mode as a current SEQUENCE. In order to provide this function, the computer maintains a readily accessible "scratch-pad" storage of the coordinate values stored with the most recent SEQUENCE associated with each axis, and in the RUN mode in response to the selection of any SEQUENCE, in or out of the order other stored succession of SEQUENCES, the cutting element is directed to the same spatial point as it would have been if the current SEQUENCE had been selected in the course of stepping through the succession of SEQUENCES in order. For example, for a machine system having X, Y and Z axes, such as that described in U.S. Pat. No. 3,878,983, when a two coordinate (e.g. X-Y) SEQUENCE is selected as current, the cutting element is directed first to a reference coordinate along the Z axis, and then to the two coordinates (X and Y) stored in association with the current SEQUENCE, and finally to the one coordinate (Z) stored in association with the next previous one coordinate (e.g. Z) SEQUENCE in the succession of SEQUENCES stored in the computer memory. When a one coordinate SEQUENCE is selected as current, the cutting element is directed first to a reference coordinate along the one coordinate axis, then to the two coordinates associated with the next previous two coordinate SEQUENCE in the succession, and finally to the single one coordinate stored in association with the current SEQUENCE.

In other embodiments, the computer may reconstruct the cutting element history by directing movement to previous and current SEQUENCE coordinated in a different order, such as initial Z, A, X-Y, Z for a X-Y-Z-A axis system, or as a further example, eliminate the initial one coordinate (Z) displacement, and use the A, Z, X-Y order. In plane switching SEQUENCES, still other orders may be used.

In addition to maintaining the so-called scratch-pad storage of the most recent coordinate values in the present embodiment, the computer also displays to the operator an indication of these values. For example, in the embodiment described in conjunction with FIGS. 3 and 5, when an X-Y SEQUENCE is selected as current in the PROGRAM-EDIT mode, the X and Y displays, 71 and 72, display the X and Y coordinate values associated with the current SEQUENCE, and, in addition, Z and A displays 81 and 211 display the respective Z and A coordinate values associated with the next previous Z and A SEQUENCES in the stored succession of SEQUENCES. If the current SEQUENCE is the first unprogrammed SEQUENCE, then all of the X, Y, Z and A displays provide the operator with an indication of the corresponding most recent coordinate values. Furthermore, in the present embodiment, the operator may transfer the displayed values directly to the coordinate data registers associated with one of the SEQUENCE controls 70, 80 and 202 so that those values may be stored with the current SEQUENCE. This aspect of the present invention is particularly useful to the operator, since it permits him to not only easily keep abreast of the most recent cutting element excursions along or about the axes (or along or about those axes not associated with the current SEQUENCE), but also to utilize these coordinate values in programming further SEQUENCES by directly entering those values in the current SEQUENCE. In other embodiments, other program parameters (e.g. tool offset distance and direction, spindle speed, and current cutting element tool type or designation) may be similarly displayed to the operator.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. In a numerically controlled machine tool system including a machine tool, said machine tool including a cutting element and a workpiece positioning element, and
   a control system for controlling the relative position of said cutting element and workpiece positioning element including:
   A. an operator controlled positioning control means including axes drive means for controlling the relative position of said cutting element to a succession of spatial points defined with respect to a reference point on said workpiece positioning element, wherein each of said spatial points corresponds to a point at which a subsequent machining operation is to be performed,
   B. a position encoding means for generating a coordinate data signal representative of the coordinates corresponding to the current position of said cutting element with respect to said reference point,
   C. an operator controlled sequence entry means including a digital computer, interface means and operator control/programming station, said sequence entry means being for generating and storing in the memory of said digital computer at least one sequence of digital data comprising a set of digital signals for an associated one of said succession of spatial points, said set of digital signals being related to:
   the coordinate data signal representative of the associated one of said succession of spatial points,
   D. a transformation means including said digital computer, said interface, and said operator control/programming station, said transformation means being for selectively transforming each of said stored sequences of digital data into a corresponding series of encoded machine tool control signals wherein each of said series is for directing the relative position of said cutting element toward an associated one of said spatial points, and
   E. a computer controlled positioning means responsive to said control signals and including said axes drive means, said computer controlled positioning means being for successively controlling the relative position of said cutting element to be at each of said spatial points,
   an improvement to said sequence entry means comprising:
   a selectively operative absolute data entry means having:
   A. operator controlled means for generating at least one sequence comprising a set of digital signals for an associated one of said succession of spatial points, said set of digital signals being related to:
   the absolute coordinates of said associated one of said succession of spatial points, and
   B. means for storing said set in the memory of said computer.

2. In a numerically controlled machine tool system including a machine tool, said machine tool including a cutting element and a workpiece positioning element, and
   a control system for controlling the relative position of said cutting element and workpiece positioning element including:
   A. an operator controlled positioning control means including axes drive means for controlling the relative position of said cutting element to a succession of spatial points defined with respect to a reference point on said workpiece positioning element, wherein each of said spatial points corresponds to a point at which a subsequent machining operation is to be performed,
   B. a position encoding means for generating a coordinate data signal representative of the coordinates corresponding to the current position of said cutting element with respect to said reference point,
   C. an operator controlled sequence entry means including a digital computer, interface means and operator control/programming station, said sequence entry means being for generating and storing in the memory of said digital computer at least one sequence of digital data comprising a set of digital signals for an associated one of said succession of spatial points, said set of digital signals being related to:
   the coordinate data signal representative of the associated one of said succession of spatial points,
   D. a transformation means including said digital computer, said interface, and said operator control/programming station, said transformation means being for selectively transforming each of said stored sequences of digital data into a corresponding series of encoded machine tool control signals wherein each of said series is for directing the relative position of said cutting element toward an associated one of said spatial points, and
   E. a computer controlled positioning means responsive to said control signals and including said axes drive means, said computer controlled positioning means being for successively controlling the relative position of said cutting element to be at each of said spatial points, an improvement to said sequence entry means comprising:

a selectively operative incremental data entry means having:
- A. operator controlled means for generating at least one sequence comprising a set of digital signals for an associated one of said succession of spacial points, said set of digital signals being related to:
  the change in coordinates of said associated one of said succession of spatial points relative to the coordinates of the preceding spatial point in said succession,
- B. means for transforming said set of digital signals to a corresponding set, said corresponding set being related to:
  the absolute coordinates of said associated one of said succession of spatial points, and
- C. means for storing said corresponding set in the memory of said computer.

3. System according to claim 1 wherein said means for storing of said sequence entry means includes:
means for ordering said sequences in said memory in an order corresponding to the order of said spatial points in said succession, and wherein said sequence entry means further includes:
coordinate value storage means operative following the storage of a current sequence in said memory to store a most recent coordinate signal associated with each motion axis of said system, each of said most recent coordinate signals being representative of the corresponding motion axis coordinate which is stored in association with said current sequence or with the next previous sequence in said succession which includes a coordinate corresponding to said motion axis.

4. System according to claim 2 wherein said means for storing of said sequence entry means includes:
means for ordering said sequences in said memory in an order corresponding to the order of said spatial points in said succession, and wherein said sequence entry means further includes:
coordinate value storage means operative following the storage of a current sequence in said memory to store a most recent coordinate signal associated with each motion axis of said system, each of said most recent coordinate signals being representative of the corresponding motion axis coordinate which is stored in association with said current sequence or with the next previous sequence in said succession which includes a coordinate corresponding to said motion axis.

5. System according to claim 3 wherein sequence entry means further includes a means for displaying said most recent coordinate signals.

6. System according to claim 4 wherein sequence entry means further includes a means for displaying said most recent coordinate signals.

* * * * *